United States Patent
Konopka

[11] Patent Number: 5,869,937
[45] Date of Patent: Feb. 9, 1999

[54] HIGH EFFICIENCY ELECTRONIC BALLAST

[75] Inventor: John G. Konopka, Barrington, Ill.

[73] Assignee: Motorola Inc., Schaumburg, Ill.

[21] Appl. No.: 992,417

[22] Filed: Dec. 17, 1997

[51] Int. Cl.⁶ ........................................ G05F 1/00
[52] U.S. Cl. .............. 315/291; 315/209 R; 315/209 CD; 315/244; 315/225
[58] Field of Search ................. 315/209 R, 247, 315/244, 224, 307, 225, 127, 209 T, 209 CD, DIG. 5, DIG. 7, 291

[56] References Cited

U.S. PATENT DOCUMENTS

| | | | |
|---|---|---|---|
| 5,134,344 | 7/1992 | Vos et al. | 315/239 |
| 5,444,333 | 8/1995 | Lau | 315/94 |
| 5,694,006 | 12/1997 | Konopka | 315/219 |
| 5,694,007 | 12/1997 | Chen | 315/247 |
| 5,696,431 | 12/1997 | Giannopoulos et al. | 315/308 |

*Primary Examiner*—Don Wong
*Assistant Examiner*—Haissa Philogene
*Attorney, Agent, or Firm*—Kenneth D. Labudda; Gary J. Cunningham

[57] ABSTRACT

An electronic ballast (100) for powering at least one gas discharge lamp (10) comprises an inverter (300), an output circuit (400), and a switching circuit (500). Output circuit (400) includes a resonant inductor (440) and a resonant capacitor (460). Switching circuit (500) is coupled between the resonant capacitor (460) and an AC ground node such as circuit ground node (60), and is operable to effectively disconnect the resonant capacitor (460) after the lamp (10) ignites, thereby eliminating circulating current and significantly enhancing ballast energy efficiency. Switching circuit preferably comprises an electronic switch (600) and a pulse circuit (700), and optionally includes a diode matrix for use in ballasts for powering two or more lamps. In one embodiment, pulse circuit (800) monitors for lamp replacement and provides automatic ignition of a replaced lamp.

25 Claims, 12 Drawing Sheets

HIGH EFFICIENCY ELECTRONIC BALLAST

FIELD OF THE INVENTION

The present invention relates to the general subject of circuits for powering gas discharge lamps and, in particular, to a high efficiency electronic ballast.

BACKGROUND OF THE INVENTION

A number of existing electronic ballasts for gas discharge lamps include an inverter and a series resonant output circuit that provide a high voltage for igniting the lamps and a high frequency current for efficiently powering the lamps.

A series resonant output circuit draws a certain amount of input current from the inverter. Apart from that portion of the input current that is needed for powering the lamps, a considerable portion of the input current is reactive in nature and is commonly referred to as "circulating current." In "driven" type inverters that do not utilize resonant current feedback for commutating the inverter switches, the circulating current serves no useful purpose after the lamps are ignited and has the undesirable effect of increasing the power dissipation in the resonant circuit and in certain inverter components such as the inverter switches.

The power losses due to circulating current degrade ballast energy efficiency and reliability, and are a significant impediment to efforts to reduce the physical size, weight, and cost of the ballast itself. These problems are particularly acute for higher power ballast circuits, such as those for driving three or four lamps, for which miniaturization efforts are highly contingent upon reduced power losses in the inverter and output circuit.

In addition to the problem of circulating current, many existing electronic ballasts that employ a driven type inverter have the disadvantage of requiring special protection circuitry to prevent self-destruction of the inverter and resonant output circuit in the event of lamp failure or lamp fault conditions. Such protection circuitry is often very extensive and quite complex, and adds considerably to the resulting physical size and cost of the ballast.

It is therefore apparent that a need exists for an electronic ballast that substantially reduces or eliminates circulating current and that lessens or obviates the need for extensive protection circuitry. Such a ballast would be significantly more energy efficient than existing ballasts, would be amenable to reductions in size, weight, and cost, and would therefore represent a considerable advance over the prior art.

DETAILED DESCRIPTION OF THE PREFERRED EMBODIMENTS

Figure 1:
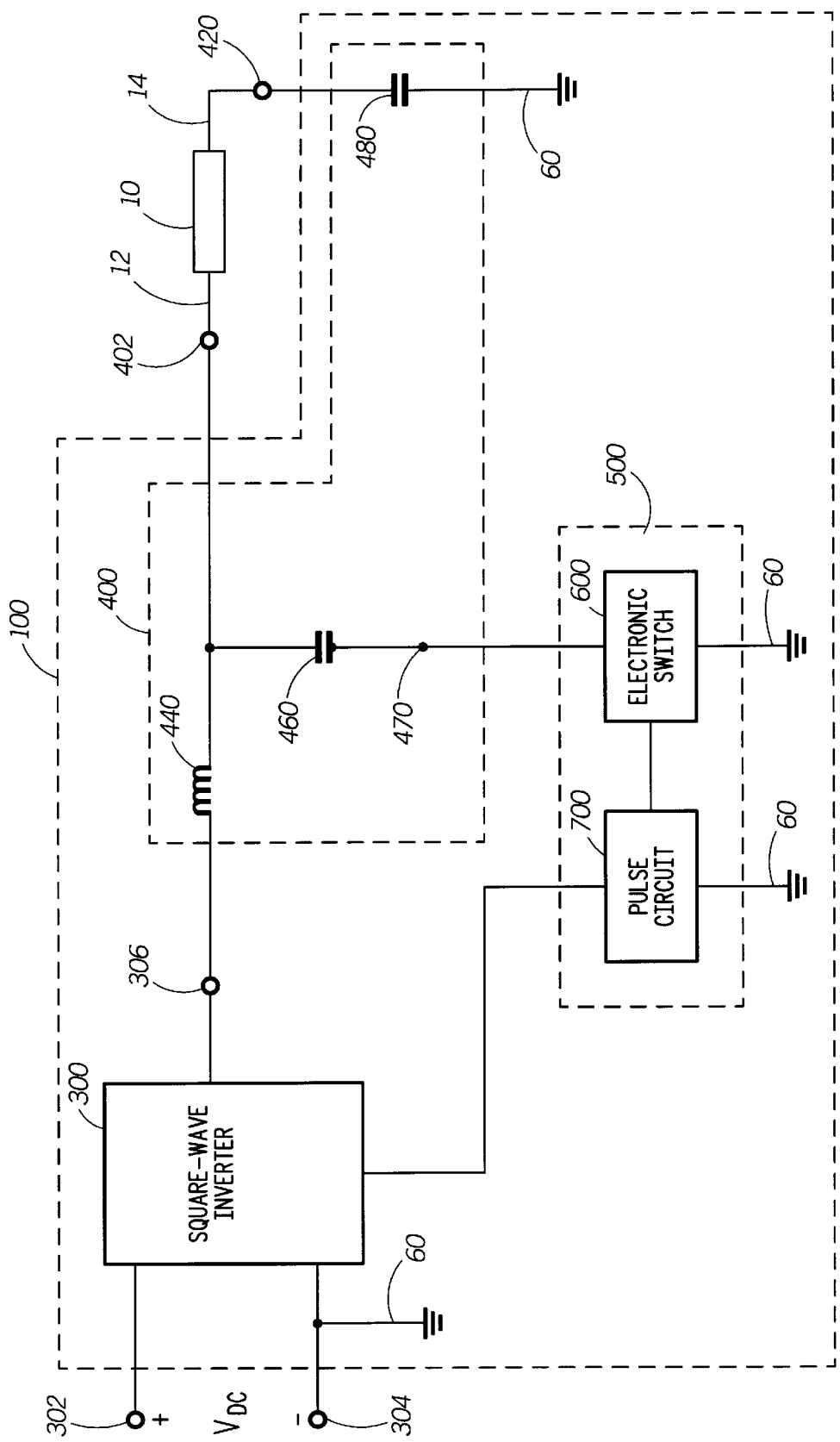
FIG. 1 describes a high efficiency electronic ballast, in accordance with a first preferred embodiment of the present invention.

An electronic ballast 100 for powering at least one gas discharge lamp 10 is described in FIG. 1. Ballast 100 comprises an inverter 300, an output circuit 400, and a switching circuit 500.

Inverter 300 includes first and second input terminals 302,304 for receiving a source of DC voltage, $V_{DC}$, and an inverter output terminal 306. Second input terminal 304 is coupled to a circuit ground node 60. During operation, inverter 300 provides a substantially squarewave output voltage at inverter output terminal 306. More specifically, inverter 300 provides a voltage between inverter output terminal 306 and circuit ground node 60 that varies between a peak value of $V_{DC}$ and minimum value of zero. Preferably, in order to provide sufficient voltage to operate lamp 10, $V_{DC}$ is chosen to have a value that is substantially greater than the normal operating voltage of lamp 10. For example, if lamp 10 is a F32T8 fluorescent lamp with a normal root-mean-square (rms) operating voltage of approximately 140 volts, $V_{DC}$ should be set to at least about 500 volts.

Output circuit 400 comprises a first output wire 402, a return output wire 420, a first resonant inductor 440, a first resonant capacitor 460, and a DC blocking capacitor 480. First output wire 402 is coupleable to a first end 12 of first gas discharge lamp 10, and return output wire 420 is coupleable to a second end 14 of lamp 10. First resonant inductor 440 is coupled between inverter output terminal 306 and first output wire 402. First resonant capacitor 460 is coupled between first output wire 402 and a first node 470. DC blocking capacitor 480 is coupled between return output wire 420 and circuit ground node 60.

In general, switching circuit 500 is coupled between first node 470 and an AC ground node. As described in FIG. 1, the preferred AC ground node is circuit ground node 60 because it provides a convenient ground reference and thus supports implementation of switching circuit 500 using compact, cost-effective circuitry. However, it should be appreciated that circuit ground node 60 is only one of several possible AC ground nodes in ballast 100. For example, output wire 420 and first input terminal 302 of inverter 300 are also AC ground nodes since their steady-state voltages are substantially DC and devoid of any significant AC component. Therefore, switching circuit 500 may alternatively be coupled to an AC ground node other than circuit ground node 60, but would require an implementation having circuitry referenced to the particular AC ground node selected.

During operation, switching circuit 500 provides: (i) an ignition mode wherein AC current is allowed to flow through resonant capacitor 460 for a predetermined ignition period in order to supply a high voltage for igniting gas discharge lamp 10; and (ii) a steady-state operating mode wherein AC current is substantially prevented from flowing through resonant capacitor 460 after completion of the ignition period.

Ballast 100 thus operates with enhanced energy efficiency by effectively "switching out" resonant capacitor 460 after the lamp 10 has been given a chance to ignite and begin operating normally. This has the advantage of eliminating circulating current and thereby reducing power dissipation in inverter 300 and resonant inductor 440. Consequently, resonant inductor 440 may be implemented using a much smaller size magnetic assembly. Additionally, because it is switched out of the circuit for the vast majority of time and thus carries negligible average current, resonant capacitor 460 may be realized using a relatively inexpensive and physically smaller ceramic type capacitor. Further, because resonant capacitor 460 is present only for a limited period of time and is then switched out of the circuit, ballast 100 requires no special protection circuitry since potentially destructive sustained high voltage conditions are inherently prevented from occurring when lamp 10 is either removed or failed. Other advantages of ballast 100 include prevention of arcing between fixture sockets and lamp pins, and reliable "power limited" operation if lamp 10 exhibits "diode lamp" behavior. The result is a ballast 100 that is not only significantly more energy efficient and cost effective than existing ballasts, but that is also highly amenable to reduction in physical size and weight.

As illustrated in FIG. 1, switching circuit 500 preferably includes an electronic switch 600 and a pulse circuit 700. Electronic switch 600 is coupled between first node 470 and circuit ground node 60. Pulse circuit 700, which is coupled between inverter 300 and electronic switch 600, is operable to provide a signal for rendering electronic switch 600 conductive during the ignition period and substantially non-conductive after completion of the ignition period.

Figure 2:
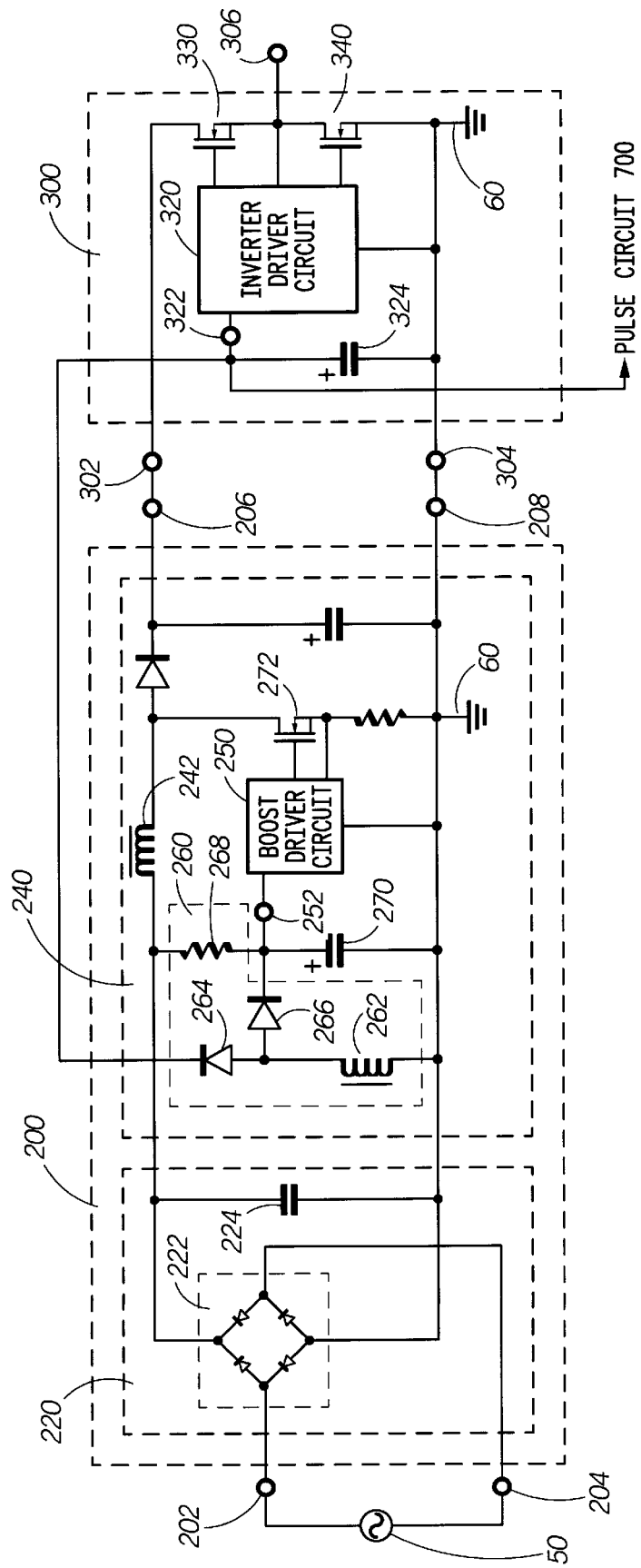
FIG. 2 describes an AC-to-DC converter and a half-bridge type inverter, in accordance with the preferred embodiments of the present invention.

Turning now to FIG. 2, in a preferred embodiment, ballast 100 further includes an AC-to-DC converter 200 comprising a pair of input connections 202,204, a pair of output connections 206,208, a rectifier circuit 220, and a boost converter 240. Boost converter 240 provides a number of well-known operational benefits, such as power factor correction and line regulation. Boost converter 240 is particularly useful, when ballast 100 is intended to operate from a conventional 120 volt or 277 volt AC line source, for supplying a DC voltage, $V_{DC}$, to inverter 300 that is high enough (e.g., 500 volts) to guarantee that sufficient voltage is present for normal operation of lamp 10.

As shown in FIG. 2, input connections 202,204 are adapted to receive a source of alternating current (AC) 50, and output connections 206,208 are coupled to the input terminals 302,304 of inverter 300. Rectifier circuit 220, which is preferably implemented using a full-wave diode bridge 222 and a high frequency bypass capacitor 224, is coupled to input connections 202,204 and is operable to provide an unfiltered, full-wave rectified voltage across capacitor 224. Boost converter 240 is coupled between rectifier circuit 220 and output connections 206,208, and is operable to provide a substantially DC voltage, $V_{DC}$, across the input terminals 302,304 of inverter 300. Boost converter 240 includes a boost driver circuit 250 and a bootstrap circuit 260 for supplying operating power to boost driver circuit 250. Boost driver circuit 250 may be implemented using a conventional pulse-width modulator (PWM) integrated circuit (IC), such as the MC2845 PWM IC, or a power factor correction (PFC) IC, such as the MC33262 PFC IC, both of which are manufactured by Motorola, Inc.

As illustrated in FIG. 2, inverter 300 is preferably implemented as a driven half-bridge type inverter, comprising a first inverter switch 330, a second inverter switch 340, and an inverter driver circuit 320. First inverter switch 330 is coupled between first input terminal 302 and output terminal 306. Second inverter switch 340 is coupled between inverter output terminal 306 and circuit ground node 60. Inverter switches 330,340 are shown as field-effect transistors (FETs), but may alternatively be realized using other controllable power switching devices such as bipolar junction transistors (BJTs). Inverter driver circuit 320 is coupled to, and operable to provide complementary commutation of, inverter switches 330,340. That is, inverter driver circuit 320 controls switches 330,340 so that when first inverter switch 330 is on, second inverter switch 340 is off, and vice-versa. Inverter driver circuit 320 includes a DC supply input 322 that is coupled to bootstrap circuit 260 of boost converter 240. Inverter driver circuit 320 is readily implemented using a conventional driver IC, such as the IR2151 high-side driver IC manufactured by International Rectifier, along with associated peripheral circuitry.

Inverter 300 is not necessarily limited to a half-bridge type inverter, but may be implemented using any type of inverter that provides a substantially squarewave voltage to output circuit 400. For example, inverter 300 may be realized as a single switch inverter like that which is described in U.S. Pat. No. 5,694,006, the disclosure of which is incorporated herein by reference.

Figure 3:
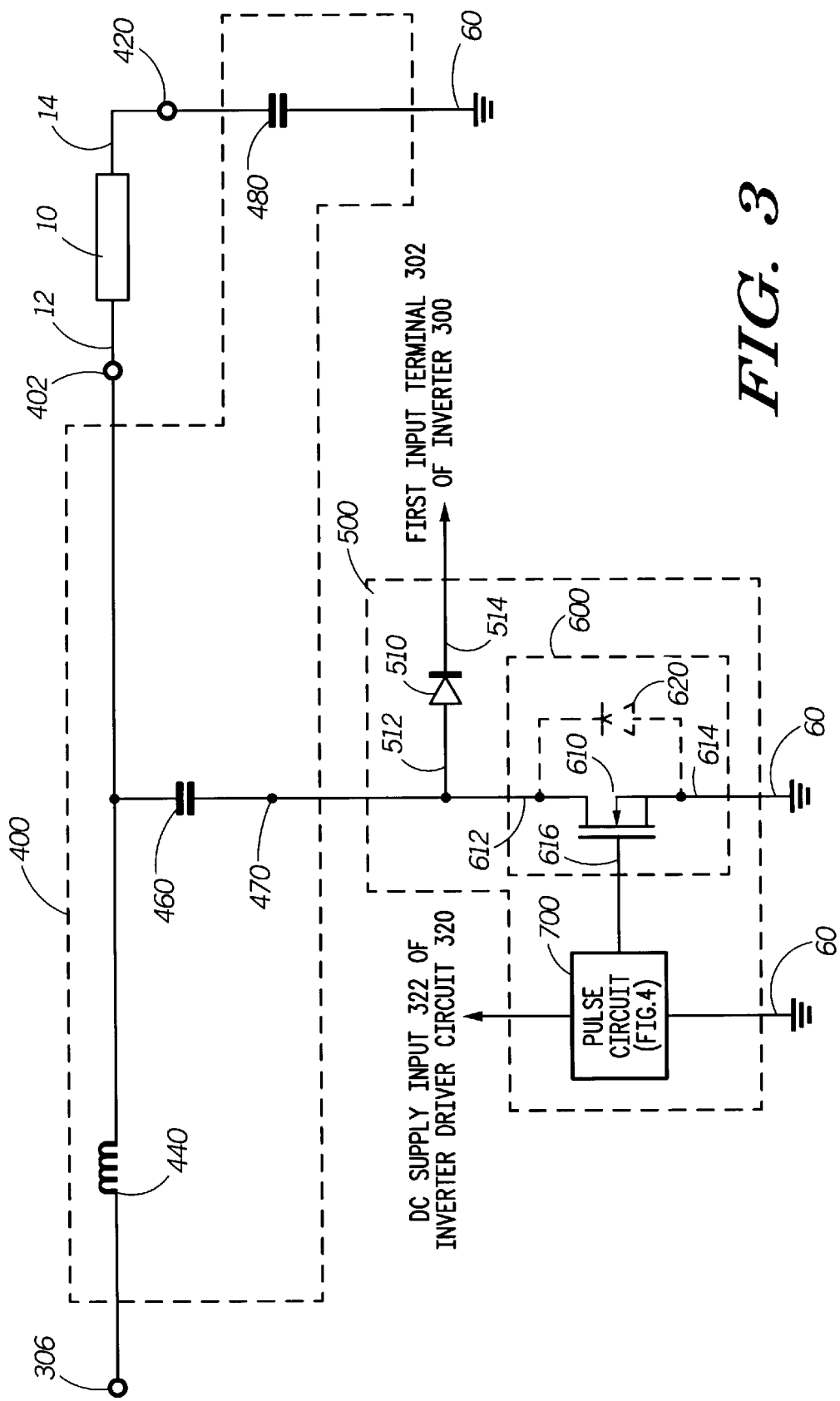
FIG. 3 describes an output circuit and switching circuit for use in a ballast for powering one gas discharge lamp, in accordance with a first preferred embodiment of the present invention.

Turning now to FIG. 3, electronic switch 600 is preferably implemented as an N-channel field-effect transistor (FET) 610 having a drain lead 612 coupled to first node 470, a source lead 614 coupled to circuit ground node 60, and a gate lead 616 coupled to pulse circuit 700. FET 610 internally includes a diode 620 that allows current to flow up from circuit ground node 60 into resonant capacitor 460. Internal diode 620 is important to the desired operation of electronic switch 600 when implemented in a ballast for driving one lamp, since it provides a circuit path for the negative half-cycles of the AC current that, along with the positive half-cycles, must flow through resonant capacitor 460 in order to develop a high voltage for igniting lamp 10 during the ignition period. Note that if switch 600 is implemented using an alternative device that does not include an internal diode, such as a BJT, an additional diode must be included and connected in a manner analogous to internal diode 620 in order to preserve the desired functionality of electronic switch 600. Switching circuit 500 preferably further includes a clamping diode 510 having an anode 512 coupled to first node 470 and a cathode 514 coupled to first input terminal 302 of inverter 300. Clamping diode 510 protects FET 610 from excessive voltage by limiting the voltage at drain lead 612 to a maximum value equal to $V_{DC}$ (e.g., 500 volts). In the absence of clamping diode 510, the voltage at first node 470 may rise to a level as high as $2*V_{DC}$ (e.g., 1000 volts) when lamp 10 is either removed or failed. Consequently, in the absence of clamping diode 510, electronic switch 600 would require an expensive FET with a drain-to-source voltage rating of 1000 volts or more. By limiting the voltage at first node 470 to a more modest level, electronic switch 600 can be reliably implemented using a much less costly device with a drain-to-source voltage rating as low as 550 or 600 volts.

Figure 4:
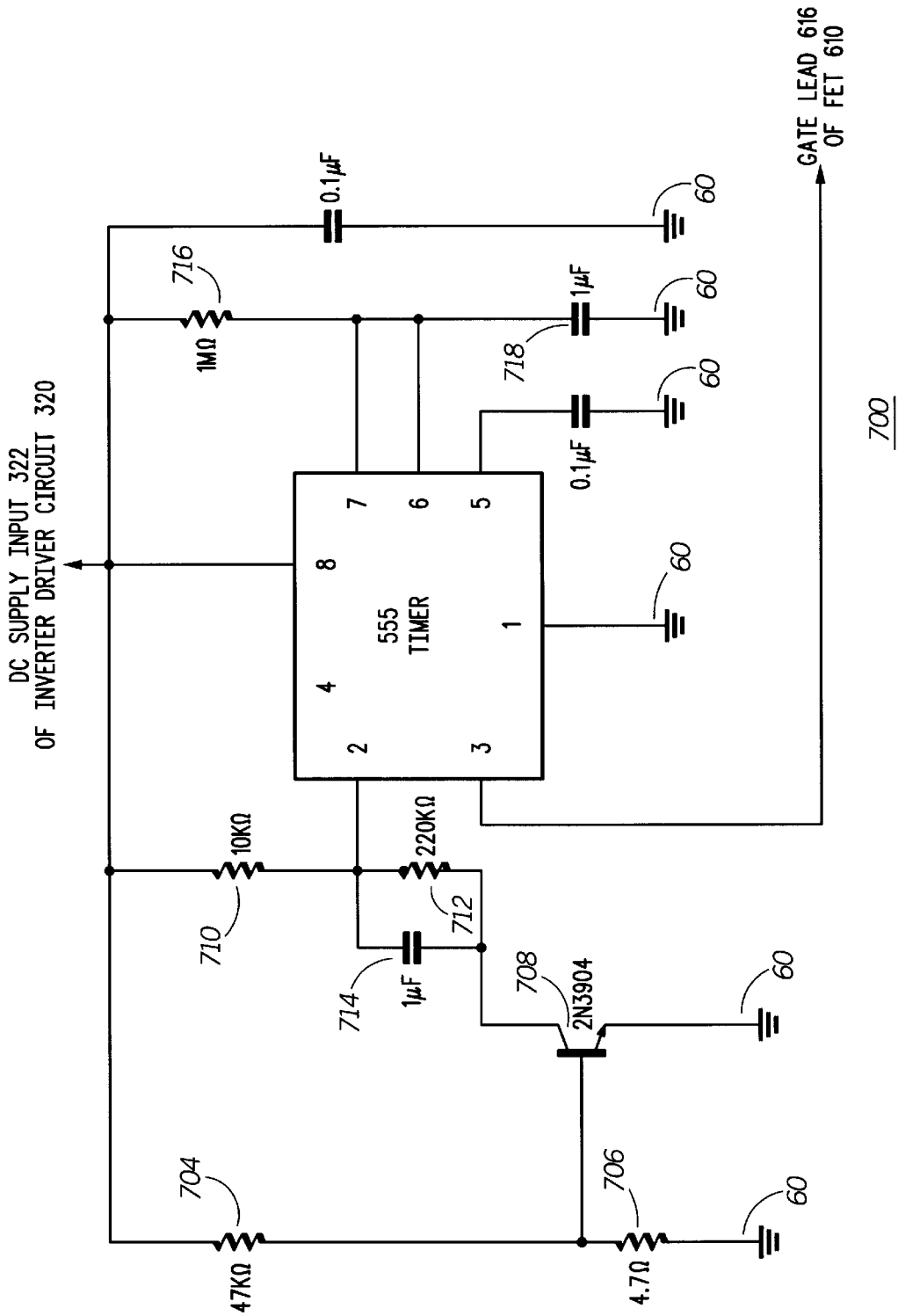
FIG. 4 describes a pulse circuit implemented as a one-shot timer circuit, in accordance with a first preferred embodiment of the present invention.

Referring now to FIG. 4, in a first preferred embodiment of ballast 100, pulse circuit 600 includes a one-shot timer circuit coupled between DC supply input 322 of inverter driver circuit 320 and gate lead 616 of FET 610. One-shot timer circuit is operable, in response to initiation of inverter operation, to provide a momentary voltage pulse for turning FET 610 on for a limited period of time, such as 1 second. One-shot timer circuit is readily implemented using a standard timer integrated circuit, such as the 555 timer IC manufactured by Motorola, Inc., along with associated peripheral circuitry.

The detailed operation of ballast 100 is now explained with reference to FIGS. 2, 3, and 4 as follows. Turning first to FIG. 2, when AC power is first applied to the ballast, capacitor 270 is uncharged, and boost driver circuit 250 is off and remains off until at least such time as the voltage at DC supply input 252 reaches a certain predetermined level corresponding to the "turn-on threshold" of the device or circuitry used to implement boost driver circuit 250. With AC power applied to the ballast, rectifier circuit 220 provides a full-wave rectified voltage across capacitor 224, and capacitor 270 begins to charge up due to current delivered to it via resistor 268. Once the voltage across capacitor 270 reaches the turn-on threshold, boost driver circuit 250 turns on and, using the energy stored in capacitor 270, begins switching of boost FET 272. At this point, the energy stored in capacitor 270 begins to be depleted. However, with boost switching now taking place, voltage is developed across boost inductor 242 and its coupled bootstrap winding 262. Energy from bootstrap winding 262 is then transferred to capacitor 270 and boost driver circuit 250 via diode 266. In this way, bootstrap circuit 260 provides power for initiating and sustaining operating of boost driver circuit 250.

Prior to the onset of boost switching, capacitor 324 is uncharged and inverter driver circuit 320 is off. However, once boost switching begins, energy begins to be transferred into capacitor 324 via diode 264 of bootstrap circuit 260. The voltage across capacitor 324 then rapidly increases and inverter driver circuit 320 soon activates and commences complementary switching of inverter switches 330,340. Bootstrap circuit 260 then continues to provide steady-state power for sustaining operation of inverter driver circuit 320.

As described in FIG. 4, pulse circuit 700 preferably comprises a one-shot timer circuit that delivers a single pulse to the gate lead 616 of FET 610 in order to turn FET 610 on for a brief period of time (e.g., 1 second) when inverter 300 begins to operate. Prior to the onset of bootstrapping and the subsequent startup of inverter 300, timer 702 is off and the voltage at pin 3 of timer 702 is zero. Once bootstrapping begins, the voltage at the DC supply input 322 of inverter driver circuit 320 rises, turns on inverter driver circuit 320, and rapidly continues to rise toward its preferred steady-state value of approximately 15 volts. Pin 8 of timer 702 is coupled to DC supply input 322. Once the voltage at pin 8, hereinafter referred to as $V_{CC}$, reaches approximately 6 volts, the base-to-emitter voltage of transistor 708 becomes large enough (i.e., approximately 0.6 volts) to turn transistor 708 on. Resistors 704,706 act as a voltage divider in this regard. Since capacitor 714 is initially uncharged, it behaves as a momentary short circuit that, with transistor 708 on, momentarily couples pin 2 to circuit ground node 60. In response to the voltage at pin 2 falling below $(\frac{1}{3})*V_{CC}$, timer 702 triggers and provides a voltage at pin 3 that is approximately equal to $V_{CC}$. Therefore, at the instant that transistor 708 is turned on, the voltage at pin 3 goes to 6 volts and then continues to increase rapidly along with $V_{CC}$ up to 15 volts. With transistor 708 turned on, capacitor 714 begins to charge up and, due to the large resistance of resistor 712 relative to that of resistor 710, quickly reaches a voltage that exceeds $(\frac{1}{3})*V_{CC}$. However, regardless of the increased voltage at pin 2, the voltage at pin 3 remains equal to $V_{CC}$ for a period of time that is dependent upon the RC time constant of resistor 716 and capacitor 718. More specifically, once initiated by the voltage at pin 3 falling below $(\frac{1}{3})*V_{CC}$, the voltage at pin 3 remains equal to $V_{CC}$ until such time as the voltage at pin 6 (i.e., the voltage across capacitor 718) reaches $(\frac{2}{3})*V_{CC}$, at which point the voltage at pin 3 is forced back to zero. Because capacitor 714 is now considerably charged up, the voltage at pin 2 remains significantly greater than $(\frac{1}{3})*V_{CC}$ and therefore prevents initiation of a new pulse at pin 3. Thus, the voltage at pin 3 then remains at zero for as long as power is applied to the ballast.

Referring now to FIGS. 2 and 3, and recalling the above discussion regarding pulse circuit 700, FET 610 is turned on at about the same time as inverter driver circuit 320 and preferably remains on for about one second thereafter in order to provide sufficient time for lamp 10 to ignite and begin operating normally before effectively "removing" resonant capacitor 460 from the rest of the circuit. With inverter driver circuit 320 on, inverter switches 330,340 are switched on and off in a complementary fashion and at a high frequency rate that is preferably in excess of 20,000 Hertz and that is equal to or reasonably close to the natural resonant frequency of resonant inductor 440 and resonant capacitor 460. When FET 610 is on during the ignition period, resonant capacitor 460 is momentarily coupled to circuit ground node 60 and AC current is allowed to flow through resonant capacitor 460. As alluded to previously, internal diode 620 importantly provides a path for the negative half-cycles of the AC current that, along with the corresponding positive half-cycles, must flow through resonant capacitor 460 during the ignition period. During the ignition period, resonant inductor 440 and resonant capacitor 460 thus operate in well-known fashion as a series resonant circuit in which resonant capacitor 460 develops a high voltage for igniting lamp 10.

After lamp 10 has had approximately 1 second to ignite and begin operating normally, FET 610 is turned off by termination of gate drive voltage from pulse circuit 700. With FET 610 off, positive current is prevented from flowing through resonant capacitor 460 to circuit ground node 60. Internal diode 620 momentarily allows negative current to flow up from circuit ground node 60 and through resonant capacitor 460, but this continues only until resonant capacitor 460 becomes peak charged, after which time negligible current flows through resonant capacitor 460. With resonant capacitor 460 effectively disconnected, the current delivered to lamp 10 is limited solely by resonant inductor 440. Since essentially all of the current flowing into resonant inductor 440 is transferred to lamp 10, output circuit 400 operates in a highly efficient manner with no circulating current and minimal power dissipation in resonant inductor 440.

Figure 5:
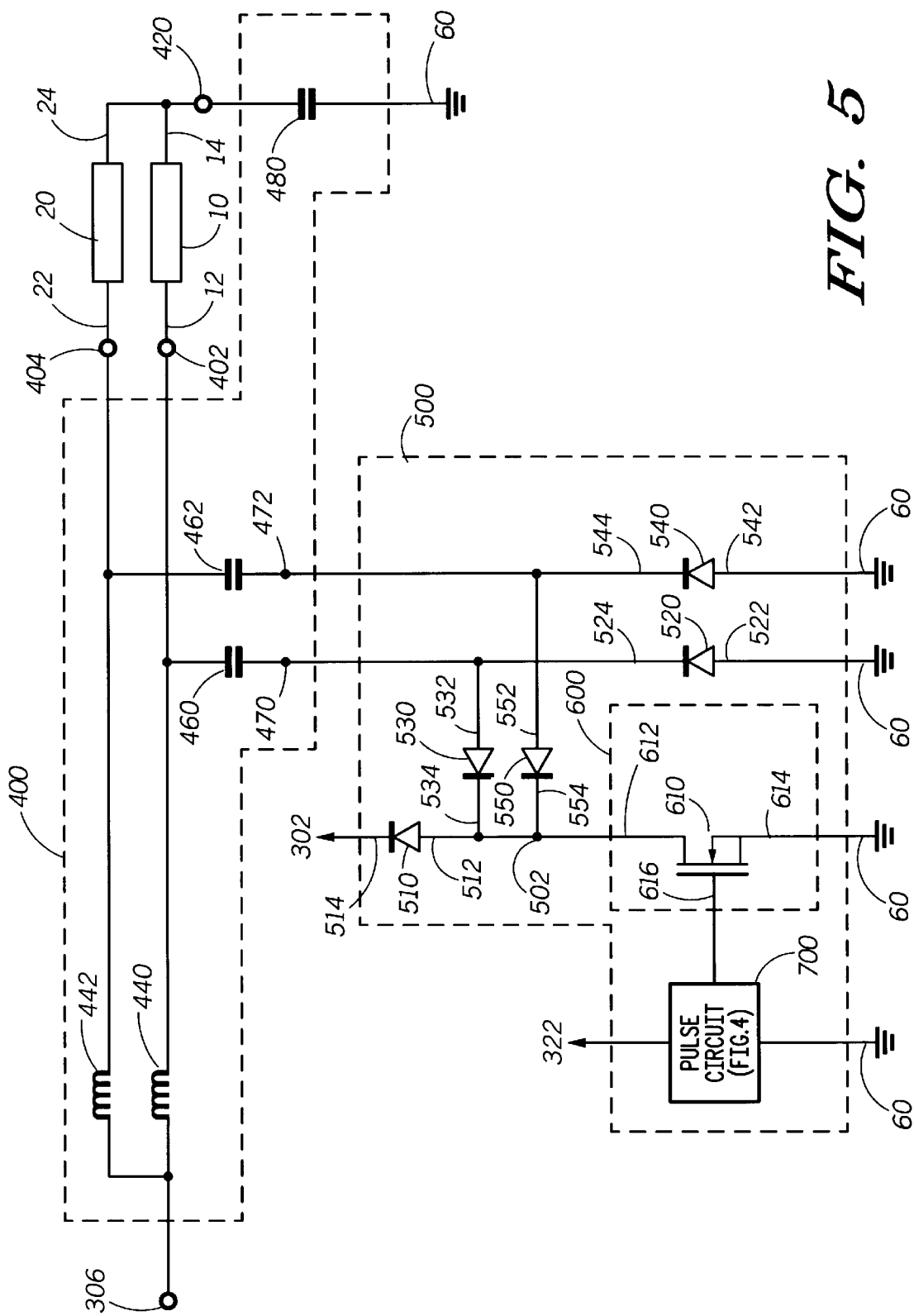
FIG. 5 describes an output circuit and switching circuit for use in a ballast for powering two gas discharge lamps, in accordance with a first preferred embodiment of the present invention.

FIG. 5 describes additional circuitry that can be added to output circuit 400 and switching circuit 500 for use in a ballast for powering two gas discharge lamps 10,20. Specifically, output circuit 400 further comprises a second output wire 404, a second resonant inductor 442, and second resonant capacitor 462. Second output wire 404 is coupleable to a first end 22 of a second gas discharge lamp 20, and return output wire 420 is further coupleable to a second end 24 of second lamp 20. Second resonant inductor 442 is coupled between inverter output terminal 306 and second output wire 404. Second resonant capacitor 462 is coupled between second output wire 404 and a second node 472.

As illustrated in FIG. 5, switching circuit 500 comprises a first diode 520, a second diode 530, a third diode 540, and a fourth diode 550. First diode 520 has an anode 522 coupled to circuit ground node 60 and a cathode 524 coupled to first node 470. Second diode 530 has an anode 532 coupled to first node 470 and a cathode 534 coupled to a central node 502. Third diode 540 has an anode 542 coupled to circuit ground node 60 and a cathode 544 coupled to second node 472. Fourth diode 550 has an anode 552 coupled to second node 472 and a cathode 554 coupled to central node 502. Electronic switch 600 is again preferably implemented as an N-channel FET 610 having its drain lead 612 coupled to central node 502 and its source lead 614 coupled to circuit ground node 60. Clamping diode 510 has its anode 512 coupled to central node 502 and its cathode 514 coupled to the first input terminal 302 of inverter 300.

The diode array consisting of diodes 520,530,540,550 makes it possible for switching circuit 500 to properly operate in a ballast for powering two lamps in parallel while economically employing only a single device for electronic switch 600. More specifically, diodes 530,550 effectively isolate each lamp and resonant capacitor from the others so that if, for example, first lamp 10 is removed or failed, second lamp 20 may still be properly ignited and operated in a normal manner. Additionally, diodes 520,540 each provide a circuit path for the negative half-cycles of the AC current that must flow through their respective resonant capacitors 460,462 during the ignition period. It should be noted that, in contrast with the one lamp ballast previously described in FIG. 3, the internal diode 620 of FET 610 plays no important role in the circuit of FIG. 5 since its previous function of providing a path for negative half-cycles of the AC current is fulfilled by diodes 520,540. Therefore, for multi-lamp ballasts, electronic switch 600 may optionally be realized using an alternative device, such as a BJT, without requiring that an additional diode be included in parallel with the device.

Switching circuit 500 is thus suitable, with relatively modest modifications, for use in ballasts for powering two or more lamps. More specifically, through use of diodes 520, 530,540,550, switching circuit 500 supports true parallel operation of two lamps, yet requires only a single switching device (e.g. FET 610) for electronic switch 600 and thereby avoids the considerably greater expense of using a separate switching device for each lamp.

Figure 6:
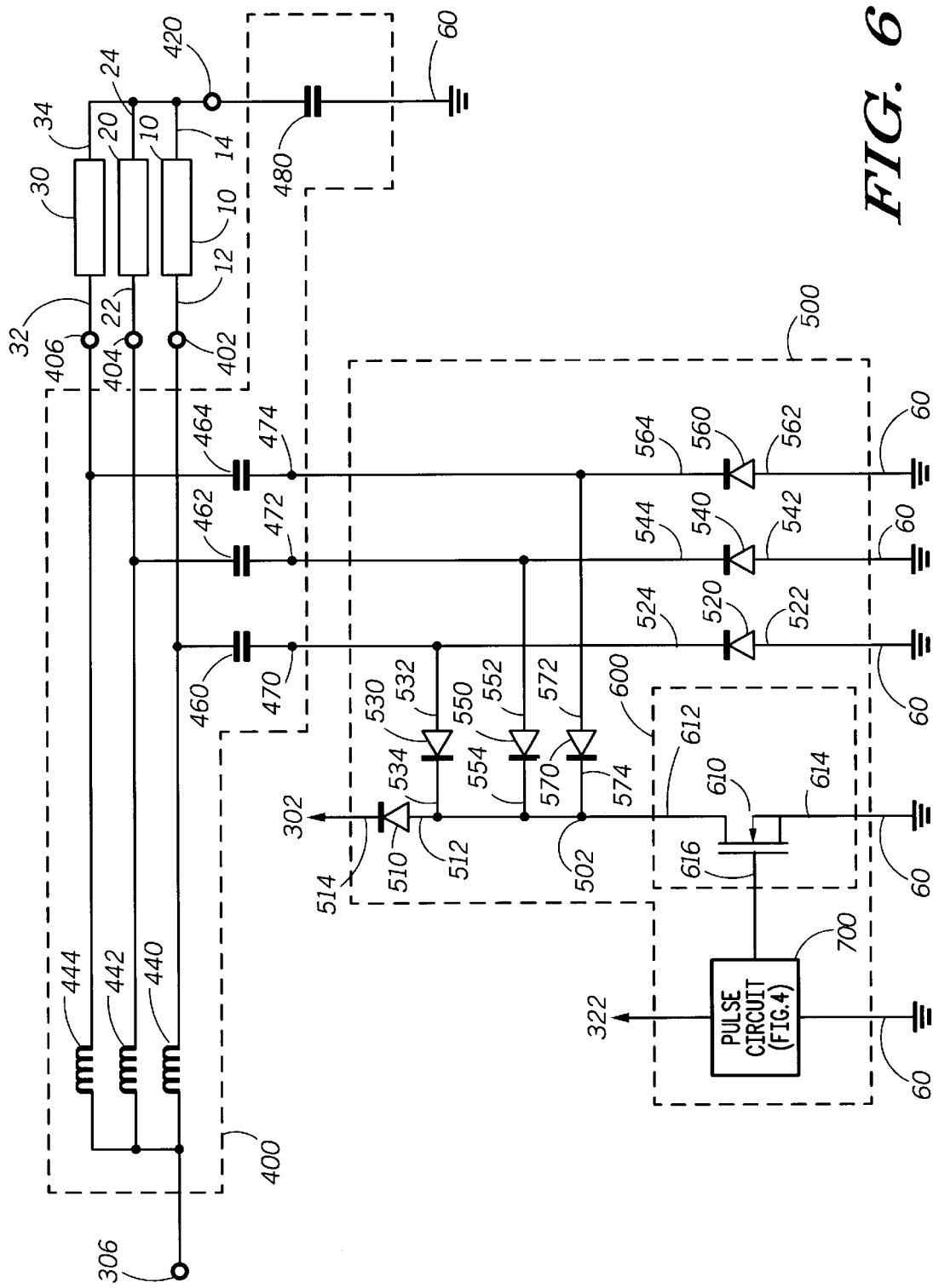
FIG. 6 describes an output circuit and switching circuit for use in a ballast for powering three gas discharge lamps, in accordance with a first preferred embodiment of the present invention.

FIG. 6 illustrates modifications to output circuit 400 and switching circuit 500 for use in a ballast for powering three lamps. Output circuit 400 further comprises a third output wire 406, a third resonant inductor 444, and a third resonant capacitor 464. Third output wire 406 is coupleable to a first end 32 of a third gas discharge lamp 30, while return output wire 420 is further coupleable to a second end 34 of third lamp 30. Third resonant inductor 444 is coupled between inverter output terminal 306 and third output wire 406. Third resonant capacitor 464 is coupled between third output wire 406 and a third node 474.

As described in FIG. 6, switching circuit 500 additionally includes a fifth diode 560 and a sixth diode 570. Fifth diode 560 has an anode 562 coupled to circuit ground node 60 and a cathode 564 coupled to third node 474. Sixth diode 570 has an anode coupled to third node 474 and a cathode coupled to central node 502.

Figure 7:
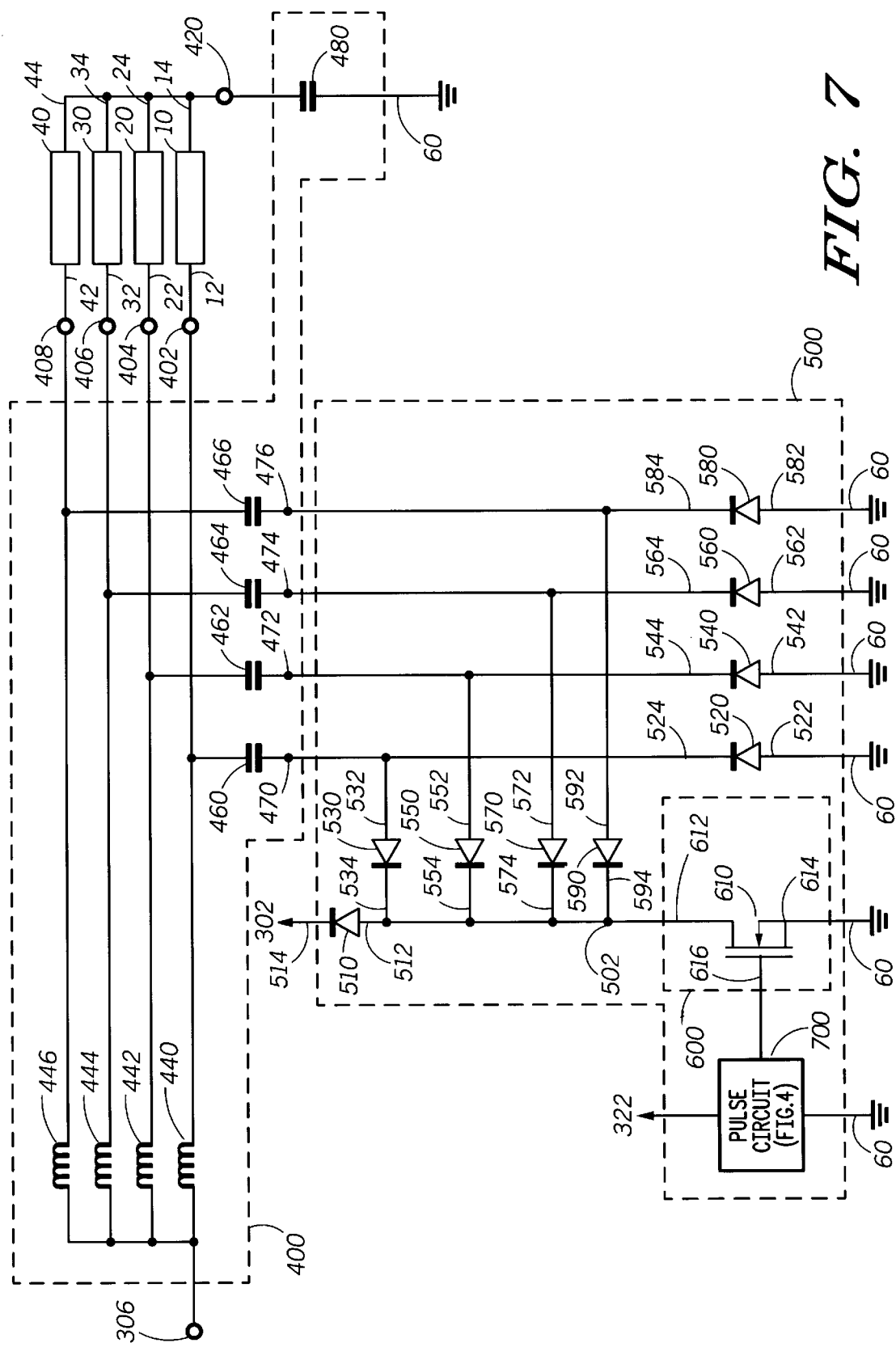
FIG. 7 describes an output circuit and switching circuit for use in a ballast for powering four gas discharge lamps, in accordance with a first preferred embodiment of the present invention.

Turning now to FIG. 7, output circuit 400 and switching circuit 500 may be further modified for use in a ballast for powering four gas discharge lamps. Specifically, output circuit 400 further comprises a fourth output wire 408, a fourth resonant inductor 446, and a fourth resonant capacitor 466. Fourth output wire 408 is coupleable to a first end 42 of fourth gas discharge lamp 40, and return output wire 420 is further coupleable to a second end 44 of lamp 40. Fourth resonant inductor 446 is coupled between inverter output terminal 306 and fourth output wire 408. Fourth resonant capacitor 466 is coupled between fourth output wire 408 and a fourth node 476.

Switching circuit 500 further includes a seventh diode 580 and an eighth diode 590. Seventh diode 580 has an anode 582 coupled to circuit ground node 60 and a cathode 584 coupled to fourth node 476. Eighth diode 590 has an anode 592 coupled to fourth node 476 and a cathode 594 coupled to central node 502.

Figure 8:
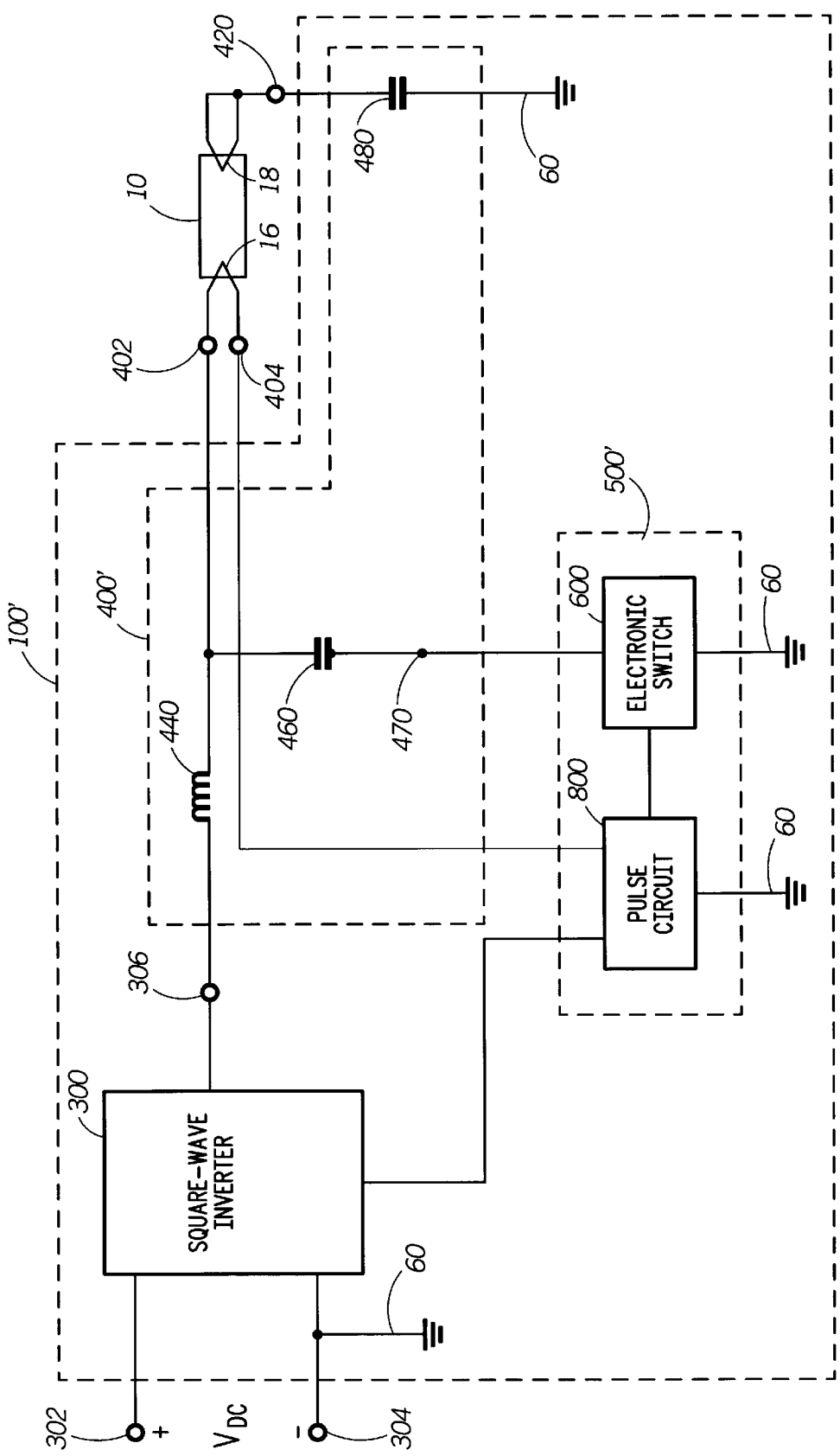
FIG. 8 describes a high efficiency electronic ballast, in accordance with a second preferred embodiment of the present invention.

In a second preferred embodiment of the present invention, as illustrated in FIG. 8, electronic ballast 100' comprises an inverter 300, an output circuit 400', and a switching circuit 500'.

Inverter 300 includes first and second input terminals 302,304 for receiving a source of DC voltage, $V_{DC}$, and an inverter output terminal 306. Second input terminal 304 is coupled to a circuit ground node 60. Output circuit 400' comprises a first output wire 402, a second output wire 404, a return output wire 420, a first resonant inductor 440, a first resonant capacitor 460, and a DC blocking capacitor 480. First output wire 402 is coupleable to second output wire 404 through a first filament 16 of gas discharge lamp 10. Return output wire 420 is coupleable to a second filament 18 of lamp 10. First resonant inductor 440 is coupled between inverter output terminal 306 and first output wire 402. First resonant capacitor 460 is coupled between first output wire 402 and a first node 470. DC blocking capacitor is coupled between return output wire 420 and circuit ground node 60.

Switching circuit 500' is coupled between first node 470 and an AC ground node. Circuit ground node 60 is the preferred choice for the AC ground node since it provides a convenient ground reference that supports implementation of switching circuit 500' using compact, cost-effective circuitry. During operation, switching circuit 500' provides: (i) an ignition mode wherein AC current is allowed to flow through resonant capacitor 460 for a predetermined ignition period in order to supply a high voltage for igniting gas discharge lamp 10; (ii) a steady-state operating mode wherein, in order to efficiently supply power to gas discharge lamp 10, AC current is substantially prevented from flowing through resonant capacitor 460; and (iii) a relamping mode wherein, in response to replacement of lamp 10, AC current is allowed to flow through resonant capacitor 460 for a predetermined relamping period in order to supply a high voltage for igniting the replaced lamp.

Ballast 100' thus provides the added benefit of automatically igniting a replaced lamp without requiring cycling of the ballast input power. That is, when a failed lamp is removed and replaced with a new lamp, ballast 100' detects that relamping has occurred and, in response, automatically provides a high voltage for igniting the replaced lamp.

As described in FIG. 8, switching circuit 500' preferably includes an electronic switch 600 and a pulse circuit 800. Electronic switch 600 is coupled between first node 470 and circuit ground node 60. Pulse circuit 800, which is coupled to inverter 300, second output wire 404, and electronic switch 600, is operable to provide a signal for rendering electronic switch 600 conductive during the ignition and relamping periods and substantially non-conductive during the steady-state operating mode.

Ballast 100' optionally includes an AC-to-DC converter 200, and inverter 300 is preferably implemented as a driven half-bridge type inverter, the structure and detailed operation of which were previously described with reference to FIG. 2.

Figure 9:
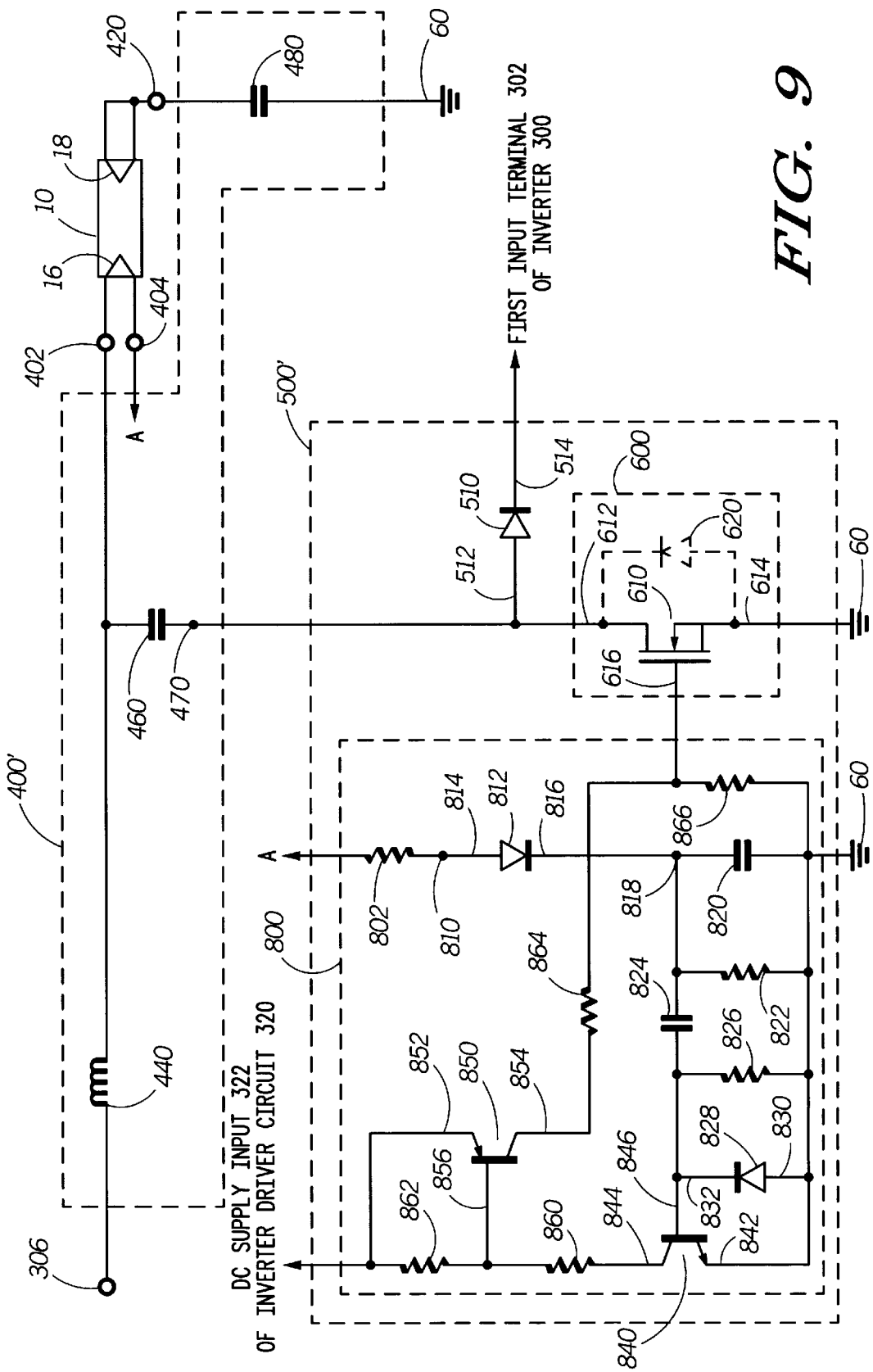
FIG. 9 describes an output circuit and switching circuit for use in a ballast for powering one gas discharge lamp, in accordance with a second preferred embodiment of the present invention.

Turning now to FIG. 9, electronic switch 600 is again preferably implemented as an N-channel FET 610 and switching circuit preferably includes a clamping diode 510 for protecting FET 610 from excessive voltage. Pulse circuit 800 is now preferably realized as a discrete timing circuit comprising a first sensing resistor 802, a blocking diode 812, a first capacitor 820, a first resistor 822, a first transistor switch 840, a second capacitor 824, a discharge diode 828, a second resistor 826, a second transistor switch 850, a third resistor 862, a fourth resistor 860, a fifth resistor 864, and a sixth resistor 866. First sensing resistor 802 is coupled between second output wire 404 and a fifth node 810. Blocking diode 812 has an anode 814 coupled to fifth node 810 and a cathode 816 coupled to a sixth node 818. First capacitor 820 and first resistor 822 are each coupled between sixth node 818 and circuit ground node 60. First transistor switch 840, which is preferably implemented using an NPN-type bipolar junction transistor, has an emitter lead 842, a collector lead 844, and a base lead 846. Emitter lead 842 is coupled to circuit ground node 60. Second capacitor 824 is coupled between sixth node 818 and the base lead 846 of first transistor switch 840. Discharge diode 828 has an anode 830 coupled to circuit ground node 60 and a cathode 832 coupled to the base lead 846 of first transistor switch 840. Second resistor 826 is coupled between circuit ground node 60 and the base lead 846 of first transistor switch 840. Second transistor switch 850, which is preferably implemented as a PNP-type bipolar junction transistor, has an emitter lead 852, a collector lead 854, and a base lead 856. Emitter lead 852 is coupled to the DC supply input 322 of inverter driver circuit 320. Third resistor 862 is coupled between the emitter lead 852 and the base lead 856 of second transistor switch 850. Fourth resistor 860 is coupled between the base lead 856 of second transistor switch 850 and the collector lead 844 of first transistor switch 840. Fifth resistor 864 is coupled between the collector lead 854 of second transistor switch 850 and the gate lead 616 of FET 610. Finally, sixth resistor 866 is coupled between the gate lead 616 of FET 610 and circuit ground node 60.

The detailed operation of pulse circuit 800 is now explained with reference to FIGS. 8 and 9 as follows. When inverter 300 starts to operate, a "charging" current begins to flow from inverter output terminal 306 through resonant inductor 440, first filament 16, and into pulse circuit 800. Within pulse circuit 800, capacitor 824 is initially uncharged. Thus, current flows through resistor 802, diode 812, capacitor 824, resistor 826, and generates sufficient voltage across resistor 826 to turn transistor 840 on. With transistor 840 on, resistor 860 is coupled to circuit ground node 60. Since about 15 volts (from DC supply input 322 of inverter driver circuit 320) is present at the emitter lead 852 of transistor 850, once resistor 860 is coupled to circuit ground node 60, sufficiently negative base-to-emitter voltage develops across resistor 862 to turn transistor 850 on. With transistor 850 on, current flows through resistors 864 and 866. The resulting voltage across resistor 866 is sufficient (i.e., greater than 5 volts) to turn FET 610 on and thereby couple resonant capacitor 460 to circuit ground node 60.

Transistor 840 remains on for only a limited period of time (i.e., preferably about 1 second) since capacitor 824 charges up and soon limits the current through resistor 826 to a level less than that which is required to maintain sufficient base-to-emitter voltage for transistor 840. Once transistor 840 turns off, resistor 860 is no longer coupled to circuit ground node 60 and, consequently, transistor 850 turns off as well. With transistor 850 turned off, the voltage across resistor 866 falls to zero, causing FET 610 to turn off. In this way, pulse circuit 800 provides a momentary voltage pulse for turning FET 610 on for a limited period of time following startup of inverter 300.

During steady-state operation, capacitor 824 will tend to attempt to discharge via resistor 822 and diode 828. However, as long as lamp filament 16 remains intact, a small amount of charging current continues to be delivered to capacitor 824 and thereby keeps the capacitor substantially peak charged. Consequently, since it continues to be deprived of sufficient base-to-emitter voltage to turn on, transistor 840 remains off. On the other hand, if lamp 10 is physically disconnected from output wires 402,404 (such as what occurs during relamping), charging current no longer flows into pulse circuit 800, and capacitor 824 discharges via resistor 822 and diode 828. Apart from its function of providing a circuit path for discharging capacitor 824, diode 828 also protects transistor 840 from potentially excessive negative base-to-emitter voltage that might otherwise occur when capacitor 824 discharges. By the time that lamp 10 is reconnected or a new lamp is inserted, capacitor 824 has substantially discharged and, therefore, a substantial charging current begins to flow through capacitor 824 and produces a voltage across resistor 826 that is sufficient to turn transistor 840 on. Note that capacitor 820 acts as a noise suppression element that reduces the likelihood of spurious activation of transistor 840 due to noise or short-duration transients that typically occur during the relamping process. The previously described events (i.e., transistor 850 turns on and causes FET 610 to turn on for a limited period of time) are then repeated. In this way, pulse circuit 800 provides a relamping period for automatically igniting a replaced lamp.

Figure 10:
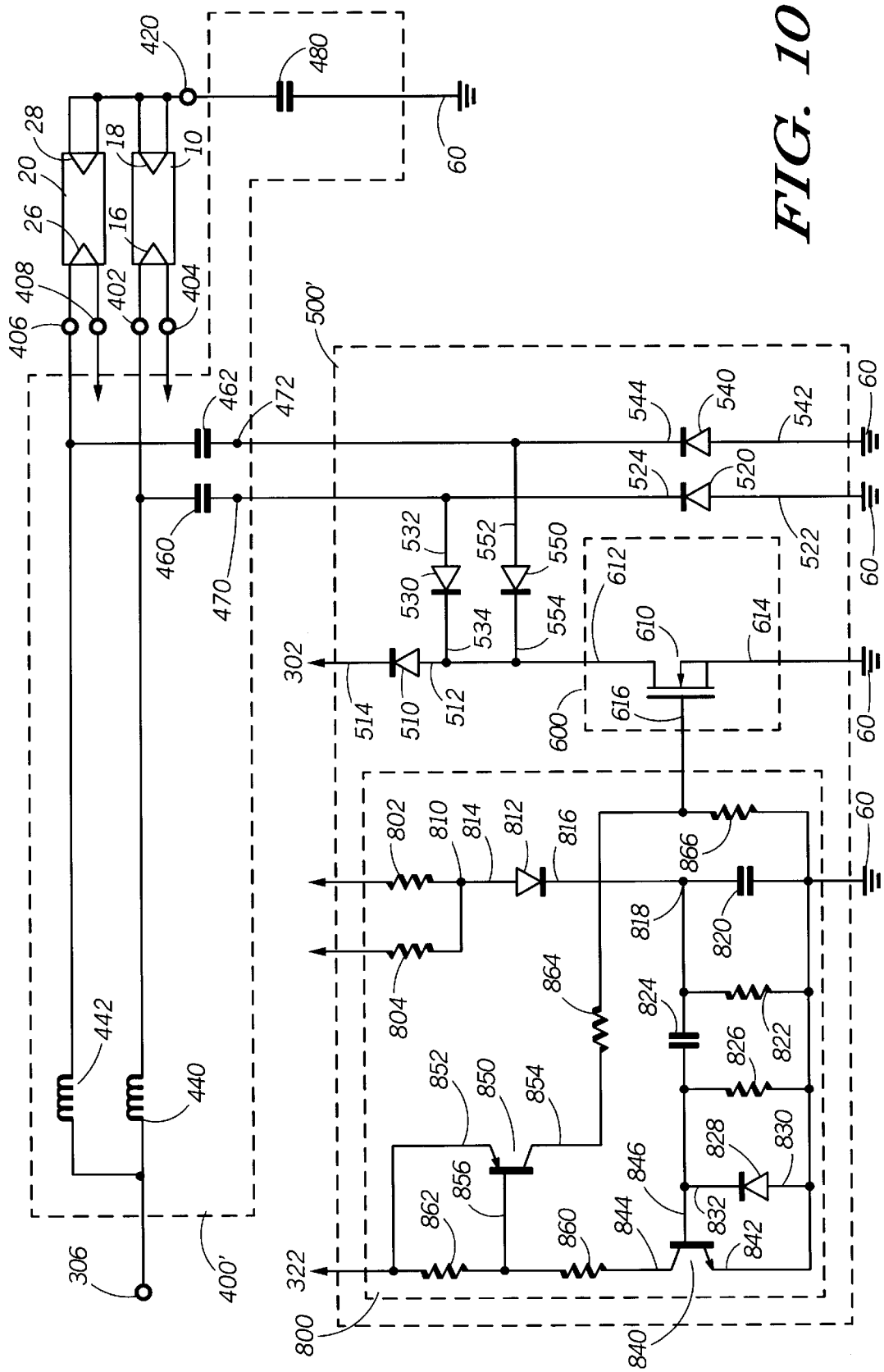
FIG. 10 describes an output circuit and switching circuit for use in a ballast for powering two gas discharge lamps, in accordance with a second preferred embodiment of the present invention.

Turning now to FIG. 10, output circuit 400' and switching circuit 500' may be modified for use in a ballast for powering two gas discharge lamps. Output circuit 400' further comprises a third output wire 406, a fourth output wire 408, a second resonant inductor 442, and a second resonant capacitor 462. Third output wire 406 is coupleable to fourth output wire 408 through a first filament 26 of second gas discharge lamp 20. Return output wire 420 is further coupleable to a second filament 28 of second lamp 20. Second resonant inductor 442 is coupled between inverter output terminal 306 and third output wire 406. Second resonant capacitor 462 is coupled between third output wire 406 and a second node 472.

As described in FIG. 10, switching circuit 500' further includes a first diode 520, a second diode 530, a third diode 540, and a fourth diode 550. First diode 520 has an anode 522 coupled to circuit ground node 60 and a cathode coupled to first node 470. Second diode 530 has an anode 532 coupled to first node 470 and a cathode 534 coupled to central node 502. Third diode 540 has an anode 542 coupled to circuit ground node 60 and a cathode coupled to second node 472. Fourth diode 550 has an anode 552 coupled to second node 472 and a cathode 554 coupled to central node 502. The drain lead 612 of FET 610 is coupled to central node 502, and the source lead 614 of FET 610 is coupled to circuit ground node 60. Pulse circuit 800 further includes a second sensing resistor 804 coupled between fourth output wire 408 and fifth node 810. Second sensing resistor 804 allows pulse circuit 800 to detect removal and subsequent replacement of second lamp 20. Thus, pulse circuit 800 provides a relamping period in response to replacement of either one or both of the lamp 10,20. As described below, additional lamps may be accommodated by including additional sensing resistors in pulse circuit 800.

Figure 11:
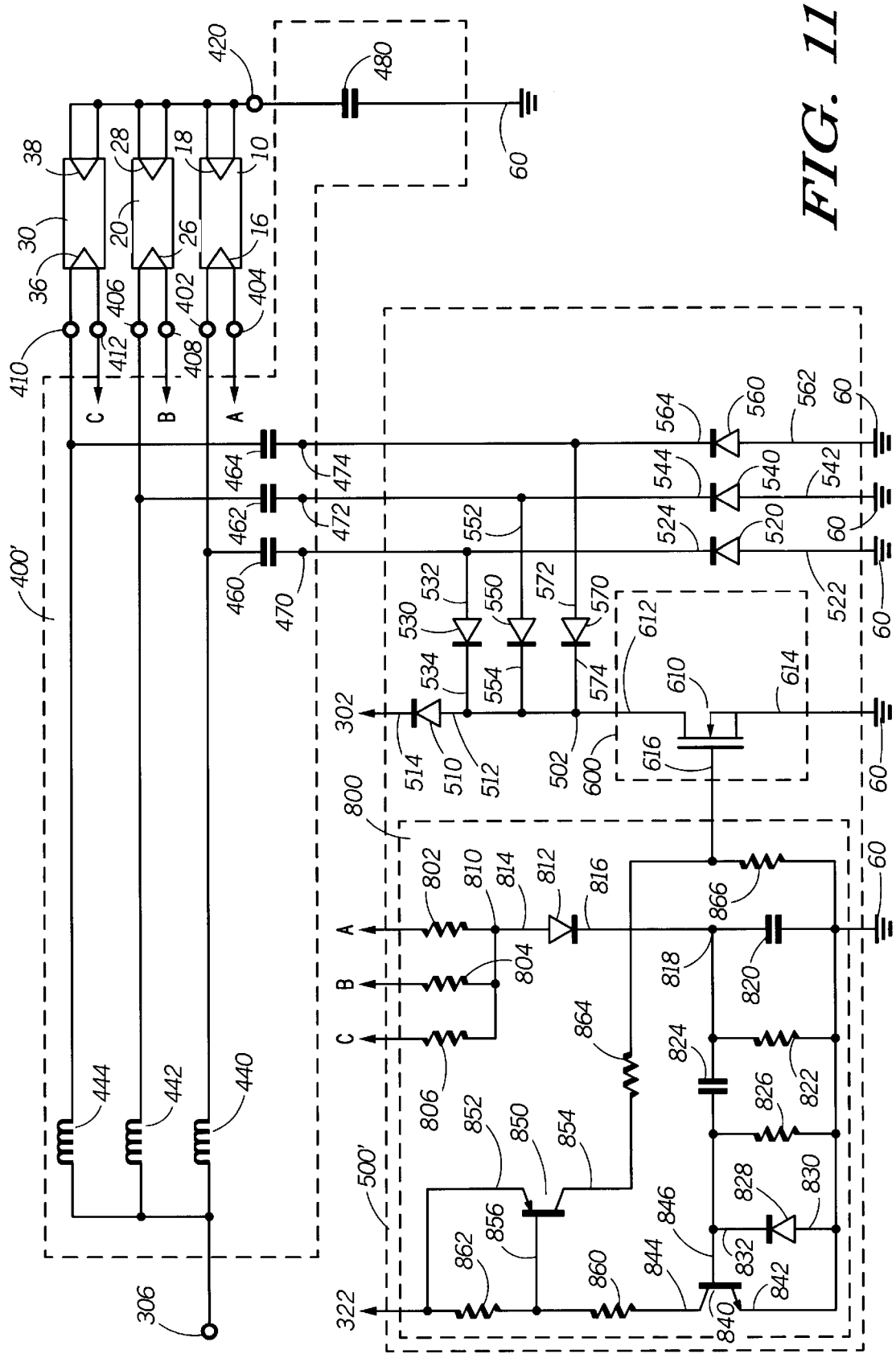
FIG. 11 describes an output circuit and switching circuit for use in a ballast for powering three gas discharge lamps, in accordance with a second preferred embodiment of the present invention.

Output circuit 400' and switching circuit 500' are similarly adaptable for use in ballasts for powering three or four gas discharge lamps. For a three lamp ballast, as described in FIG. 11, output circuit 400' further includes fifth and sixth output wires 410,412, a third resonant inductor 444, and a third resonant capacitor 464. Fifth output wire 410 is coupleable to sixth output wire 412 through a first filament 36 of a third gas discharge lamp 30, and return output wire 420 is further coupleable to a second filament 38 of third lamp 30. Third resonant inductor 444 is coupled between inverter output terminal 306 and fifth output wire 410. Third resonant capacitor 464 is coupled between fifth output wire 410 and a third node 474. Switching circuit 500' further includes a fifth diode 560 and a sixth diode 570. Fifth diode 560 has an anode 562 coupled to circuit ground node 60 and a cathode 564 coupled to third node 474. Sixth diode 570 has an anode 572 coupled to third node 474 and a cathode coupled to central node 502. Pulse circuit 800 further includes a third sensing resistor 806 coupled between sixth output wire 412 and fifth node 810.

Figure 12:
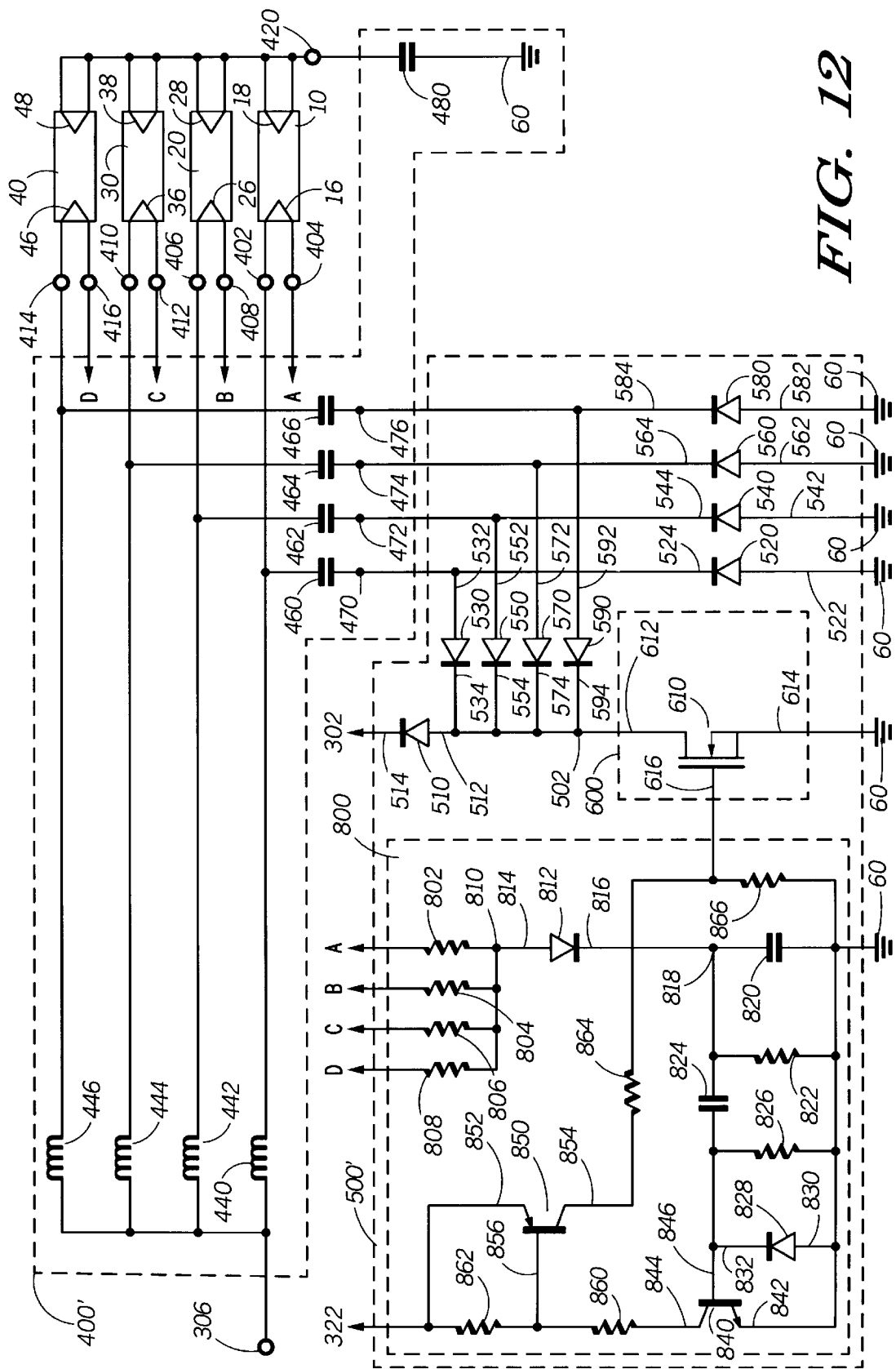
FIG. 12 describes an output circuit and switching circuit for use in a ballast for powering four gas discharge lamps, in accordance with a second preferred embodiment of the present invention.

For a four lamp ballast, as described in FIG. 12, output circuit 400' further includes seventh and eighth output wires 414,416, a fourth resonant inductor 446, and a fourth resonant capacitor 466. Seventh output wire 414 is coupleable to eighth output wire 416 through a first filament 46 of fourth gas discharge lamp 40, and return output wire 420 is further coupleable to a second filament 48 of fourth lamp 40. Fourth resonant inductor 446 is coupled between inverter output terminal 306 and seventh output wire 414. Fourth resonant capacitor 466 is coupled between seventh output wire 414 and a fourth node 476. Switching circuit 500' further comprises a seventh diode 580 and an eighth diode 590. Seventh diode 580 has an anode 582 coupled to circuit ground node 60 and a cathode 584 coupled to fourth node 476. Eighth diode 590 has an anode 592 coupled to fourth node 476 and a cathode coupled to central node 502. Pulse circuit 800 further includes a fourth sensing resistor 808 coupled between eighth output wire 416 and fifth node 810.

Although the present invention has been described with reference to certain preferred embodiments, numerous modifications and variations can be made by those skilled in the art without departing from the novel spirit and scope of this invention.

What is claimed is:

1. An electronic ballast for powering at least one gas discharge lamp, comprising:
   an inverter operable to provide a substantially square-wave output voltage, comprising:
   first and second input terminals adapted to receive a source of substantially direct current (DC) voltage, wherein the second input terminal is coupled to a circuit ground node; and
   an inverter output terminal;
   an output circuit, comprising:
      a first output wire coupleable to a first end of a first gas discharge lamp;
      a return output wire coupleable to a second end of the first gas discharge lamp;
      a first resonant inductor coupled between the inverter output terminal and the first output wire;
      a first resonant capacitor coupled between the first output wire and a first node; and
      a DC blocking capacitor coupled between the return output wire and the circuit ground node; and
   a switching circuit coupled between the first node and an AC ground node, and operable to provide:
      (i) an ignition mode wherein AC current is allowed to flow through the resonant capacitor for a predetermined ignition period in order to supply a high voltage for igniting the gas discharge lamp; and
      (ii) a steady-state operating mode wherein AC current is substantially prevented from flowing through the resonant capacitor after completion of the ignition period.

2. The electronic ballast of claim 1, wherein the switching circuit comprises:
   an electronic switch coupled between the first node and the circuit ground node; and
   a pulse circuit coupled between the inverter and the electronic switch and operable to provide a signal for rendering the electronic switch conductive during the ignition period and substantially non-conductive after completion of the ignition period.

3. The electronic ballast of claim 2, wherein the switching circuit further comprises a clamping diode having an anode coupled to the first node and a cathode coupled to the first input terminal of the inverter.

4. The electronic ballast of claim 2, wherein the electronic switch comprises an N-channel field-effect transistor (FET) having a drain lead coupled to the first node, a source lead coupled to the circuit ground node, and a gate lead coupled to the pulse circuit.

5. The electronic ballast of claim 4, further comprising an AC-to-DC converter, including:
   a pair of input connections adapted to receive a source of alternating current;
   a pair of output connections coupled to the input terminals of the inverter;
   a rectifier circuit coupled to the input connections; and
   a boost converter coupled between the rectifier circuit and the output connections, the boost converter including a boost driver circuit and a bootstrap circuit for supplying operating power to the boost control circuit.

6. The electronic ballast of claim 5, wherein the inverter further comprises:
   a first inverter switch coupled between the first input terminal and the inverter output terminal;
   a second inverter switch coupled between the inverter output terminal and the circuit ground node; and
   an inverter driver circuit coupled to, and operable to provide complementary commutation of, the first and second inverter switches, the inverter driver circuit having a DC supply input coupled to the bootstrap circuit of the boost converter.

7. The electronic ballast of claim 6, wherein the pulse circuit comprises a one-shot timer circuit coupled between the DC supply input of the inverter driver circuit and the gate lead of the FET, the one-shot timer circuit being operable, in response to initiation of inverter operation, to provide a momentary voltage pulse for turning the FET on for a limited period of time.

8. The electronic ballast of claim 1, wherein:

the output circuit further comprises:
 a second output wire coupleable to a first end of a second discharge lamp, wherein the return output wire is further coupleable to a second end of the second gas discharge lamp;
 a second resonant inductor coupled between the inverter output terminal and the second output wire; and
 a second resonant capacitor coupled between the second output wire and a second node; and the switching circuit comprises:
 a first diode having an anode coupled to the circuit ground node and a cathode coupled to the first node;
 a second diode having an anode coupled to the first node and a cathode coupled to a central node;
 a third diode having an anode coupled to the circuit ground node and a cathode coupled to the second node;
 a fourth diode having an anode coupled to the second node and a cathode coupled to the central node;
 an electronic switch coupled between the central node and the circuit ground node; and
 a pulse circuit coupled to the electronic switch and operable to provide a signal for rendering the electronic switch conductive during the ignition period and substantially non-conductive after completion of the ignition period.

9. The electronic ballast of claim 8, wherein:

the output circuit further comprises:
 a third output wire coupleable to a first end of a third gas discharge lamp, wherein the return output wire is further coupleable to a second end of the third gas discharge lamp;
 a third resonant inductor coupled between the inverter output terminal and the third output wire; and
 a third resonant capacitor coupled between the third output wire and a third node; and the switching circuit further comprises:
 a fifth diode having an anode coupled to the circuit ground node and a cathode coupled to the third node; and
 a sixth diode having an anode coupled to the third node and a cathode coupled to the central node.

10. The electronic ballast of claim 9, wherein:

the output circuit further comprises:
 a fourth output wire coupleable to a first end of a fourth gas discharge lamp, wherein the return output wire is further coupleable to a second end of the fourth gas discharge lamp;
 a fourth resonant inductor coupled between the inverter output terminal and the fourth output wire; and
 a fourth resonant capacitor coupled between the fourth output wire and a fourth node; and the switching circuit further comprises:
 a seventh diode having an anode coupled to the circuit ground node and a cathode coupled to the fourth node; and
 an eighth diode having an anode coupled to the fourth node and a cathode coupled to the central node.

11. An electronic ballast for powering at least one gas discharge lamp, comprising:

an inverter operable to provide a substantially square-wave output voltage, comprising:
 first and second input terminals adapted to receive a source of substantially direct current (DC) voltage, wherein the second input terminal is coupled to a circuit ground node; and
 an inverter output terminal;

an output circuit, comprising:
 a set of output wires comprising a first output wire, a second output wire, and a return output wire, wherein the first output wire is coupleable to the second output wire through a first filament of a first gas discharge lamp, and the return output wire is coupleable to a second filament of the first gas discharge lamp;
 a first resonant inductor coupled between the inverter output terminal and the first output wire;
 a first resonant capacitor coupled between the first output wire and a first node; and
 a DC blocking capacitor coupled between the return output wire and the circuit ground node; and a switching circuit coupled to the second output wire, the first node, and an AC ground node, and operable to provide:
 (i) an ignition mode wherein AC current is allowed to flow through the resonant capacitor for a predetermined ignition period in order to supply a high voltage for igniting the gas discharge lamp;
 (ii) a steady-state operating mode wherein, in order to efficiently supply operating power to the gas discharge lamp, AC current is substantially prevented from flowing through the resonant capacitor; and
 (iii) a relamping mode wherein, in response to replacement of the lamp, AC current is allowed to flow through the resonant capacitor for a predetermined relamping period in order to supply a high voltage for igniting the replaced lamp.

12. The electronic ballast of claim 11, wherein the switching circuit comprises:

an electronic switch coupled between the first node and the circuit ground node;
a pulse circuit coupled to the inverter, the second output wire, and the electronic switch, the pulse circuit being operable to provide a signal for rendering the electronic switch conductive during the ignition and relamping periods and substantially non-conductive during the steady-state operating mode.

13. The electronic ballast of claim 12, wherein the switching circuit further comprises a clamping diode having an anode coupled to the first node and a cathode coupled to the first input terminal of the inverter.

14. The electronic ballast of claim 12, wherein the electronic switch comprises an N-channel field-effect transistor (FET) having a drain lead coupled to the first node, a source lead coupled to the circuit ground node, and a gate lead coupled to the pulse circuit.

15. The electronic ballast of claim 14, further comprising an AC-to-DC converter including:

a pair of input connections adapted to receive a source of alternating current;
a pair of output connections coupled to the input terminals of the inverter;
a rectifier circuit coupled to the input connections; and
a boost converter coupled between the rectifier circuit and the output connections, the boost converter including a boost driver circuit and a bootstrap circuit for supplying operating power to the boost control circuit.

16. The electronic ballast of claim 15, wherein the inverter further comprises:

a first inverter switch coupled between the first input terminal and the inverter output terminal;

a second inverter switch coupled between the inverter output terminal and the circuit ground node; and an inverter driver circuit coupled to, and operable to provide complementary commutation of, the first and second inverter switches, the inverter driver circuit having a DC supply input coupled to the bootstrap circuit of the boost converter.

17. The electronic ballast of claim 16, wherein the pulse circuit comprises:

a first sensing resistor coupled between the second output wire and a fifth node;

a blocking diode having an anode coupled to the fifth node and a cathode coupled to a sixth node;

a first capacitor coupled between the sixth node and the circuit ground node;

a first resistor coupled between the sixth node and the circuit ground node;

a first transistor switch having an emitter lead, a collector lead, and a base lead, wherein the emitter lead is coupled to the circuit ground node;

a second capacitor coupled between the sixth node and the base lead of the first transistor switch;

a discharge diode having an anode coupled to the circuit ground node and a cathode coupled to the base lead of the first transistor;

a second resistor coupled between the base lead of the first transistor and the circuit ground node;

a second transistor switch having an emitter lead, a collector lead, and a base lead, wherein the emitter lead is coupled to the DC supply input of the inverter driver circuit;

a third resistor coupled between the emitter lead and the base lead of the second transistor switch;

a fourth resistor coupled between the base lead of the second transistor switch and the collector lead of the first transistor switch;

a fifth resistor coupled between the collector lead of the second transistor switch and the gate lead of the FET; and a sixth resistor coupled between the gate lead of the FET and the circuit ground node.

18. The electronic ballast of claim 17, wherein the first transistor switch comprises a NPN-type bipolar junction transistor, and the second transistor switch comprises a PNP-type bipolar junction transistor.

19. The electronic ballast of claim 11, wherein:

the output circuit further comprises:

a third output wire and a fourth output wire, wherein the third output wire is coupleable to the fourth output wire through a first filament of a second gas discharge lamp, and the return output wire is further coupleable to a second filament of the second lamp;

a second resonant inductor coupled between the inverter output terminal and the third output wire; and a second resonant capacitor coupled between the third output wire and a second node; and the switching circuit comprises:

a first diode having an anode coupled to the circuit ground node and a cathode coupled to the first node;

a second diode having an anode coupled to the first node and a cathode coupled to a central node;

a third diode having an anode coupled to the circuit ground node and a cathode coupled to a second node;

a fourth diode having an anode coupled to the second node and a cathode coupled to the central node;

an electronic switch coupled between the central node and the circuit ground node; and a pulse circuit coupled to the electronic switch and operable to provide a signal for rendering the electronic switch conductive during the ignition and relamping periods and substantially non-conductive after completion of the ignition and relamping periods.

20. The electronic ballast of claim 19, wherein:

the switching circuit further comprises a clamping diode having an anode coupled to the central node and a cathode coupled to the first input terminal of the inverter; and the pulse circuit comprises:

a first sensing resistor coupled between the second output wire and a fifth node;

a second sensing resistor coupled between the fourth output wire and the fifth node;

a blocking diode having an anode coupled to the fifth node and a cathode coupled to a sixth node;

a first capacitor coupled between the sixth node and the circuit ground node;

a first resistor coupled between the sixth node and the circuit ground node;

a first transistor switch having an emitter lead, a collector lead, and a base lead, wherein the emitter lead is coupled to the circuit ground node;

a second capacitor coupled between the sixth node and the base lead of the first transistor switch;

a discharge diode having an anode coupled to the circuit ground node and a cathode coupled to the base lead of the first transistor;

a second resistor coupled between the base lead of the first transistor and the circuit ground node;

a second transistor switch having an emitter lead, a collector lead, and a base lead, wherein the emitter lead is coupled to the DC supply input of the inverter driver circuit;

a third resistor coupled between the emitter lead and the base lead of the second transistor switch;

a fourth resistor coupled between the base lead of the second transistor switch and the collector lead of the first transistor switch;

a fifth resistor coupled between the collector lead of the second transistor switch and the gate lead of the FET; and a sixth resistor coupled between the gate lead of the FET and the circuit ground node.

21. The electronic ballast of claim 19, wherein:

the output circuit further comprises:

fifth and sixth output wires, wherein the fifth output wire is coupleable to the sixth output wire through a first filament of a third gas discharge lamp, and the return output wire is coupleable to a second filament of the third gas discharge lamp;

a third resonant inductor coupled between the inverter output terminal and the fifth output wire; and a third resonant capacitor coupled between the fifth output wire and a third node; and the switching circuit further comprises:

a fifth diode having an anode coupled to the circuit ground node and a cathode coupled to the third node; and a sixth diode having an anode coupled to the third node and a cathode coupled to the central node.

22. The electronic ballast of claim 21, wherein:

the switching circuit further comprises a clamping diode having an anode coupled to the central node and a cathode coupled to the first input terminal of the inverter; and the pulse circuit comprises:
- a first sensing resistor coupled between the second output wire and a fifth node;
- a second sensing resistor coupled between the fourth output wire and the fifth node;
- a third sensing resistor coupled between the sixth output wire and the fifth node;
- a blocking diode having an anode coupled to the fifth node and a cathode coupled to a sixth node;
- a first capacitor coupled between the sixth node and the circuit ground node;
- a first resistor coupled between the sixth node and the circuit ground node;
- a first transistor switch having an emitter lead, a collector lead, and a base lead, wherein the emitter lead is coupled to the circuit ground node;
- a second capacitor coupled between the sixth node and the base lead of the first transistor switch;
- a discharge diode having an anode coupled to the circuit ground node and a cathode coupled to the base lead of the first transistor;
- a second resistor coupled between the base lead of the first transistor and the circuit ground node;
- a second transistor switch having an emitter lead, a collector lead, and a base lead, wherein the emitter lead is coupled to the DC supply input of the inverter driver circuit;
- a third resistor coupled between the emitter lead and the base lead of the second transistor switch;
- a fourth resistor coupled between the base lead of the second transistor switch and the collector lead of the first transistor switch;
- a fifth resistor coupled between the collector lead of the second transistor switch and the gate lead of the FET; and
- a sixth resistor coupled between the gate lead of the FET and the circuit ground node.

23. The electronic ballast of claim 19, wherein:

the output circuit further comprises:
- seventh and eighth output wires, wherein the seventh output wire is coupleable to the eighth output wire through a first filament of a fourth gas discharge lamp, and the return output wire is coupleable to a second filament of the fourth gas discharge lamp;
- a fourth resonant inductor coupled between the inverter output terminal and the seventh output wire; and
- a fourth resonant capacitor coupled between the seventh output wire and a fourth node; and the switching circuit further comprises:
- a seventh diode having an anode coupled to the circuit ground node and a cathode coupled to the fourth node; and
- an eighth diode having an anode coupled to the fourth node and a cathode coupled to the central node.

24. The electronic ballast of claim 23, wherein:

the switching circuit further comprises a clamping diode having an anode coupled to the central node and a cathode coupled to the first input terminal of the inverter; and the pulse circuit comprises:
- a first sensing resistor coupled between the second output wire and a fifth node;
- a second sensing resistor coupled between the fourth output wire and the fifth node;
- a third sensing resistor coupled between the sixth output wire and the fifth node;
- a fourth sensing resistor coupled between the eighth output wire and the fifth node;
- a blocking diode having an anode coupled to the fifth node and a cathode coupled to a sixth node;
- a first capacitor coupled between the sixth node and the circuit ground node;
- a first resistor coupled between the sixth node and the circuit ground node;
- a first transistor switch having an emitter lead, a collector lead, and a base lead, wherein the emitter lead is coupled to the circuit ground node;
- a second capacitor coupled between the sixth node and the base lead of the first transistor switch;
- a discharge diode having an anode coupled to the circuit ground node and a cathode coupled to the base lead of the first transistor;
- a second resistor coupled between the base lead of the first transistor and the circuit ground node;
- a second transistor switch having an emitter lead, a collector lead, and a base lead, wherein the emitter lead is coupled to the DC supply input of the inverter driver circuit;
- a third resistor coupled between the emitter lead and the base lead of the second transistor switch;
- a fourth resistor coupled between the base lead of the second transistor switch and the collector lead of the first transistor switch;
- a fifth resistor coupled between the collector lead of the second transistor switch and the gate lead of the FET; and
- a sixth resistor coupled between the gate lead of the FET and the circuit ground node.

25. An electronic ballast for powering at least two gas discharge lamps, comprising:

an AC-to-DC converter, comprising:
- a pair of input connections adapted to receive a source of alternating current;
- a pair of output connections;
- a rectifier circuit coupled to the input connections; and
- a boost converter coupled between the rectifier circuit and the output connections, the boost converter including a boost driver circuit and a bootstrap circuit for supplying operating power to the boost control circuit an inverter, comprising:
- first and second input terminals coupled to the output connections of the AC-to-DC converter, wherein the second input terminal is coupled to a circuit ground node;
- an inverter output terminal;
- a first inverter switch coupled between the first input terminal and the inverter output terminal;
- a second inverter switch coupled between the inverter output terminal and the circuit ground node; and
- an inverter driver circuit coupled to, and operable to provide complementary commutation of, the first and second inverter switches, the inverter driver circuit having a DC supply input coupled to the bootstrap circuit of the boost converter;

an output circuit, comprising:

a set of output wires comprising first, second, third, fourth, and return output wires, wherein the first output wire is coupleable to the second output wire through a first filament of a first gas discharge lamp, the third output wire is coupleable to the fourth output wire through a first filament of a second gas discharge lamp, and the return output wire is coupleable to a second filament of the first gas discharge lamp and a second filament of the second gas discharge lamp;

a first resonant inductor coupled between the inverter output terminal and the first output wire;

a second resonant inductor coupled between the inverter output terminal and the third output wire;

a first resonant capacitor coupled between the first output wire and a first node;

a second resonant capacitor coupled between the third output wire and a second node;

a DC blocking capacitor coupled between the return output wire and the circuit ground node; and a switching circuit, comprising:

a first diode having an anode coupled to the circuit ground node and a cathode coupled to the first node;

a second diode having an anode coupled to the first node and a cathode coupled to a central node;

a third diode having an anode coupled to the circuit ground node and a cathode coupled to a second node;

a fourth diode having an anode coupled to the second node and a cathode coupled to the central node;

an N-channel field-effect transistor (FET) having a drain lead coupled to the central node, a source lead coupled to the circuit ground node, and a gate lead coupled to the pulse circuit;

a clamping diode having an anode coupled to the central node and a cathode coupled to the first input terminal of the inverter; and a pulse circuit, comprising:

a first sensing resistor coupled between the second output wire and a fifth node;

a second sensing resistor coupled between the fourth output wire and the fifth node;

a blocking diode having an anode coupled to the fifth node and a cathode coupled to a sixth node;

a first capacitor coupled between the sixth node and the circuit ground node;

a first resistor coupled between the sixth node and the circuit ground node;

a first transistor switch having an emitter lead, a collector lead, and a base lead, wherein the emitter lead is coupled to the circuit ground node;

a second capacitor coupled between the sixth node and the base lead of the first transistor switch;

a discharge diode having an anode coupled to the circuit ground node and a cathode coupled to the base lead of the first transistor;

a second resistor coupled between the base lead of the first transistor and the circuit ground node;

a second transistor switch having an emitter lead, a collector lead, and a base lead, wherein the emitter lead is coupled to the DC supply input of the inverter driver circuit;

a third resistor coupled between the emitter lead and the base lead of the second transistor switch;

a fourth resistor coupled between the base lead of the second transistor switch and the collector lead of the first transistor switch;

a fifth resistor coupled between the collector lead of the second transistor switch and the gate lead of the FET; and a sixth resistor coupled between the gate lead of the FET and the circuit ground node.

* * * * *